3,100,157
LIQUID CONDENSATION PRODUCT OF A DRYING OIL, A POLYALKANOL, AND A POLYOXYETHYLENE POLYOL
Herbert M. Schroeder, Williamsville, and Joseph A. Pawlak, Buffalo, N.Y., assignors, by mesne assignments, to Textron Inc., a corporation of Rhode Island
No Drawing. Filed Jan. 10, 1961, Ser. No. 81,694
22 Claims. (Cl. 106—287)

The paint industry has long desired a paint or like protective coating that on the one hand would have the properties of a drying oil paint such as a linseed oil paint, and, on the other hand, would be water-soluble. The desirability of having a single paint of this type, with the combined advantages of both a drying oil paint and a water-soluble paint, cannot be questioned, but as oil and water "do not mix," this concept on its face was deemed for the most part to be impractical in the paint field. The art nevertheless has been actively engaged in attempts to solve this problem as illustrated by Arndt Patent 2,634,245, directed to water-dispersible alkyd type resins which form emulsions when dispersed in water. The Arndt process calls for the reaction of 70 to 90% by weight of an oil-modified alkyd resin with 10 to 30% by weight of polyethylene glycol. Arndt's alkyd resin used in this process and made, for example, by reacting phthalic anhydride and glycerol with the modifying oil, e.g. a mixture of soybean and tung oils or linseed oil, contains only 30 to 60% by weight of oil. The resulting resin, 30 to 60% oil-modified, is a solid or semisolid product with a viscosity as specified by Arndt of W to Z or above when diluted in 50% by weight of naphtha, or $Z_3$ at a concentration of 50% by weight in petroleum naphtha boiling at 310 to 410° F. as specifically illustrated in Arndt's Example I. This type of resinous product, 30 to 60% by weight oil-modified, when reacted with polyethylene glycol, yields a reaction product which does not have the inherent advantages found in a drying oil paint and also lacks the desired properties found in a good water-soluble paint.

In the British publication, JOCCA 40, 849–862 (October 1957), Armitage, F. and Trace, L. G., point up on page 852 some of the shortcomings (perhaps the main weakness) of the Arndt process, as the difficulty of getting a product with good stability, i.e. good emulsion stability, and good film characteristics at the same time. Both of these properties, good stability along with good film forming characteristics, are essential requirements of a satisfactory paint.

In an attempt to avoid the weakness of or primary problems encountered with the Arndt product made by reacting an oil-modified alkyd resin with polyethylene glycol, Armitage and Trace proposed a modification in which the polyethylene glycol (PEG) is built-in the alkyd resin by reacting the polyethylene glycol in admixture with the individual ingredients used to prepare the oil-modified alkyd resin (e.g. phthalic acid, pentaerythritol, linseed acids), instead of reacting the polyethylene glycol with the previously formed oil-modified alkyd resin as called for in the Arndt process.

Amitage and Trace maintained the percentage of polyethylene glycol at 10% based on the final alkyd, and, like Arndt, used short oil length alkyds, 50 to 56% oil modified. The reasons for the use of 10% polyethylene glycol and short oil length alkyds by Armitage and Trace with their PEG built-in product, are that they are found (a) increasing the amount of polyethylene glycol resulted in air dry films which develop a definite after-tack and (b) increasing the oil length resulted in a decrease in dispersibility of the product. In their work Armitage and Trace reported (Table II, page 853 in the JOCCA, supra), that with polyethylene glycols 200 and 300, the emulsions were stable; that with polyethylene glycol 400, the emulsion was only fairly stable; that with polyethylene glycol 600, the emulsion was unstable; and that with polyethylene glycols 1000 and 1500, the emulsions were not only very unstable but the products to be emulsified were difficult or very difficut to emulsify. The Armitage and Trace investigations indicated that the use of polyethylene glycol with a molecular weight of 1500 would likely result in better film properties than those obtainable with the low molecular weight polyethylene glycols 200 and 300, and to evaluate this prepared a gloss paint containing 35% resin solids made up of polyethylene glycol 1500 and an alkyd resin, 50% oil modified, along with 10% butoxyethanol to aid in stabilizing the emulsion. The resulting paint (as reported by Armitage and Trace in Table IV, page 857, JOCCA, supra), proved to have poor flow with poor leveling after brush application. Armitage and Trace conclude from this that their work leaves a considerable programme if certain defects in the Armitage-Trace paint, which are not easily corrected, are to be overcome.

In our investigations, in an attempt to obtain or retain the desired properties of a drying oil paint, we reacted polyoxyethylene polyols of 3 to 6 hydroxyl groups with 100% drying oil and with drying oils modified with small amounts, up to about 20%, of modifying agents. The oil and oil-modified products, about 80% and above oil modified, employed were liquids with relatively low viscosities compared to the high viscosity alkyd resin, 30 to 60% oil modified, products of Arndt. We found that the long oil reaction products, including products made with polyoxyethylene polyols of about 400 molecular weight and above, were easily dispersible in limited amounts of water to form solutions and these reaction products are readily made into stable solutions in greater amounts of water by addition of small amounts of a coupling solvent such as ethylene glycol monobutyl ether. We found that paints made from solutions of this type, including paints containing reaction products of the high molecular weight polyoxyethylene polyols, e.g. of 1500 molecular weight, and the liquid oil or oil-modified products, were characterized by good flow and good leveling after brush application. Also, unlike Amitage and Trace, who reported with their PEG built-in product, that polyethylene glycols 200 and 300 gave easy to emulsify products forming stable emulsions yielding tack-free films, we found that the use of low molecular weight polyoxyethylene polyols below about 400 with the liquid oil or long oil, about 80% or above oil modified, products herein described, gave products yielding definitely inferior, slow drying fims, lacking in toughness and durability.

The long oil compositions of the present invention provide paints having the desired advantages of air drying oil paints in that they form thin films which are converted by oxidation to hard, dry films having resistance to water, ultraviolet light and other film degrading factors. The long oil compositions of the present invention also provide paints having the desired advantages of water-soluble paints including low odor, non-flammablity and diminished toxicity, as well as water cleanup of brushes, tools used in painting, etc.

The compositions of the present invention unlike emulsion paints which lack mechanical stability and thus require special and involved pigmenting procedures, provide stable paint vehicles which can be pigmented in the conventional manner of grinding pigments in the paint vehicles. This applies to alkaline pigments including zinc oxide which due to its fungistatic or mildewcidal properties is highly desired in paint and which ordinarily cannot be used in emulsion paints due to sensitivity of emulsions to such materials.

Unlike emulsion paints where the physical nature of the emulsion imposes limitations upon the total solids, the compositions of the present invention also permit the formulation of paints characterized by high percentages of total solids, thus minimizing the number of coats of paint which must be applied to obtain good coverage and hiding as well as durability on weathering. In addition to fewer coats to do the required painting job, the paint compositions of the present invention, unlike emulsion paints, have been found to wet, penetrate and firmly adhere to substrates such as the chalky surfaces of weathered, previously painted surfaces.

Compared to short oil compositions of the Arndt type, the long oil compositions of the present invention made with the polyoxyethylene polyols noted above, are characterized by lower viscosity at any dilution and higher solids at application viscosity. The lower viscosity, on the one hand, makes the product easier to handle as, for example, to grind with the pigments into paint. The higher solids at application viscosity, on the other hand, provides a pain with less diluent, i.e. more paint per gallon. This last characteristic makes possible a good paint job at lower cost, as the high solid content provides greater film thickness and greater hiding and durability with fewer coats.

Our water-dispersible paint vehicle is made through reaction of a long oil drying oil component and a polyoxyethylene polyol of 3 to 6 hydroxyl groups. The drying oil component contains at least about 80, preferably at least about 85 or even upwards of about 90, weight percent of a drying or unsaturated fatty acid in esterified form. The presence of at least about 80% of the ester provides a vehicle of excellent characteristics for use on exterior surfaces and insures maximum compatability with zinc oxide. Thus the drying oil ester may be used as such or it may be reacted with up to about 10 or even up to about 15 or 20 weight percent of a modifying constituent prior to making the water-dispersible vehicle of this invention through reaction with the polyoxyethylene polyol. These percentages are based on the mixture of drying oil and modifying constituents. The modifying material contains a poly-functional group or configuration, that is it can combine, e.g. through olefin-bond polymerization or condensation, with two or more molecules of the drying oil ester or a modifying constituent.

The drying oil component and polyoxyethylene polyol are generally condensed in a proportion of about 75 to 90 weight percent of drying oil component to about 10 to 25 weight percent of the polyoxyethylene polyol based on their mixture. Preferably, the polyoxyethylene polyol reactant is about 12 to 20 weight percent based on its mixture with the drying oil component. The amount of polyoxyethylene polyol to be employed may vary with the nature of the desired product; in general, higher quantities of the polyether will impart more hydrophilic character and consequent water solubility. The precise choice of quantity of polyether employed may however vary with the characteristics of the oil or modified oil employed, such as viscosity. The choice will also vary with the desired solution viscosity as well as the drying time and other characteristics of the product.

The useful polyoxyethylene polyols have the formula $$R[-O(C_2H_4O)_nH]_m$$

where R is an $m$-valent aliphatic hydrocarbon radical of 3 to 6 carbon atoms derived from a polyhydric alcohol of 3 to 6 hydroxyl groups, $n$ is an average of 4 to 12 and $m$ is 3 to 6. These materials generally have an average molecular weight of about 500 to 2000 and advantageously the molecular weight is in the range of about 600 to 1200. The preferred polyols have 3 to 4 hydroxyl groups especially 3 such as in the case of the polyoxyethylene glycerols which are liquid, water-soluble materials that are easy to handle and give reaction products affording quick drying films. Suitable polyoxyether polyols include among others the polyoxyethylene derivatives of glycerol, trimethylol propane, hexanetriols, pentaerythritol, sorbitol, etc. It will be understood that blends of higher and lower moleucular weight polyoxyether polyols to yield mixtures within the approximate foregoing molecular weight ranges are also contemplated.

In general, any of the above polyoxyethylene polyols may be used with any of the drying oil components to obtain water thinnable materials having utility as paint vehicles. Specific characteristics of these latter vehicles can be varied to some degree by the proper choice of ingredients. For example, the higher molecular weight polyoxyethylene polyol reaction products have been demonstrated to yield tough, durable, faster drying films with desirable exterior exposure characteristics. The reaction products based on the lower molecular weight polyethers yield aqueous solutions of lower viscosity, hence enabling the formulation of paints with high vehicle non-volatile and consequently high total paint solids.

Similarly, the specific properties of the products can be varied to a degree by the choice of the drying oil component. For example, it may be desirable to base a product on a semi-drying oil such as soybean oil to obtain slower drying characteristics where the material is to be employed to improve the adhesion of synthetic latex paints or otherwise as an adhesive agent. The products of the invention which are based on linseed oil and certain of the modified linseed oils have been shown to have durability characteristics equivalent to those of conventional linseed oil, when formulated into exterior paint vehicles. For use in interior paints where drying speed, hardness and washability are primary requirements, the copolymer oil modifications can be employed with advantage.

It is preferred to include a coupling solvent in the composition in order to increase the solution range of the reaction product in water, for instance it is most advantageous to obtain a solution in water at a dilution which gives a composition having a viscosity in the approximate 1 to 3 poise range desired for surface application. Thus after the reaction product is formed it can be mixed with up to about 30 weight percent of the coupling agent, for instance about 5 or 10 to 25 weight percent, preferably about 15 to 20 weight percent, of an oil and water-soluble coupling agent. The agents are often oxygenated organic compounds such as ethers, alcohols, or esters. Preferred coupling agents are ethylene glycol ethers having the formula $$RO(CH_2CH_2O)_xR_1$$

wherein R is a monovalent hydrocarbon radical having up to about 8 carbon atoms, preferably not more than about 5 carbon atoms, $x$ is 1 to 2 and $R_1$ is hydrogen or $$-\overset{O}{\underset{\|}{C}}-CH_3$$

Advantageously, R is a lower alkyl radical having, for instance, 1 to 4 or more carbon atoms. Included within the oil and water-soluble coupling agents are ethylene chlorohydrin, butanol, ethylene glycol monobutyl ether, ethylene glycol monoethyl ether, ethylene glycol monomethyl ether, ethylene glycol monophenyl ether, ethylene glycol monoisoamyl ether, methyl butynol (2-methyl-3-butyn-2-ol), the acetates of these ethers and the corresponding diethylene glycol ethers and acetates, etc. In addition to the preferred coupling agents noted above, coupling agents giving vehicles, intermediate between a typical white milky emulsion and a translucent colloid, in a viscosity range at 40 NV of 0.5 to 3.5 poises, and which are stable for the period tested (at least two weeks) include 15 and 25% diacetone alcohol, 15 and 25% dimethyl formamide, 15 and 25% dimethyl acetamide, 15 and 25% acetonitrile, 15 and 25% tetrahydrofuran and 15 and 25% Shell's Pent-oxol (4-methoxy-4-methyl-2-pentanol). Generally, the coupling agents boil in the range of about 100 to 200° C. This constituent, as is the case with the others described, usually does not contain additional substituent groups although such may be present if the over-all effect desired is not materially reduced.

The coupling solvent is effective towards extending the amount of water in which the reaction product is soluble. The term "solution" is used to include colloidal solutions and in any event the resulting aqueous material does not show particulate matter when viewed by transmitted light. The solutions are highly stable and there is less tendency for solids such as pigments to settle upon storage than exhibited by many emulsions and paints. Should any settling occur a good dispersion can be readily re-established through agitation.

In preparing our water-dispersible vehicle the drying oil component and polyoxyethylene polyol can be reacted at an elevated temperature, for instance, of about 150 to 250° C., preferably about 200 to 225° C., in the presence or absence of a catalyst. The pressure usually approximates atmospheric but higher or lower pressures may be employed. The reactants are mixed, for instance by extensive agitation, and advantageously the reaction mixture is blanketed with nitrogen or other gas which is inert to the reaction. The reaction may be conducted in the presence of a transesterification (alcoholysis) catalyst. Suitable transesterification catalysts include, among others, alkali metal earths, heavy metal oxides, heavy metal salts, etc. The preferred catalysts include litharge and stannic chloride. In general, when the reaction is performed without a catalyst, longer reaction times are needed.

The reaction time is that which gives a liquid, water-dispersible product. The initial reaction mixture is not water-dispersible and if the reaction is extended too long the water-dispersible range can be passed. It is relatively easy, however, to follow the reaction by taking samples as the reaction progresses and testing the samples, for instance in a standard procedure in which the sample is mixed with a coupling solvent, to determine whether the product is water-dispersible. We have found it most advantageous to stop the reaction when the testing of the selected samples shows that the viscosity of the product in water approximates a minimum. The viscosity of the water solution of the reaction mixture decreases to a minimum as the reaction continues and then the viscosity increases. It is at or near, usually shortly after, reaching the minimum viscosity that we prefer the reaction to be stopped, as by discontinuing heating, in order that the vehicle can be brought to surface application viscosity with minimum dilution and at maximum paint solids to afford a product with better covering characteristics.

The reaction product usually has a viscosity of up to about 100 poises or somewhat greater, often the viscosity does not exceed about 40 poises and most advantageously is less than about 10 poises, for instance about 5 to 10 poises. Usually the reaction time is about 1 to 12 or more hours; however, we prefer times of about 2 to 6 hours.

The long oil drying oil component of the water-dispersible liquid reaction product of the present invention is an unsaturated aliphatic monocarboxylic acid ester, e.g. glyceride, whether natural or synthetic. The drying oil ester is of a fatty or alkenyl carboxylic acid having about 14 to 20, preferably about 18, carbon atoms, and 1 to 3 or more, usually at least 2, unsaturated carbon-to-carbon or olefinic bonds. The alcohol portion of the ester is of an alkane polyhydric alcohol of 3 to 6 hydroxyl groups and 3 to 6 carbon atoms. The preferred alkanol source of the ester radical is glycerol which affords glycerides such as those occurring in nature. The drying oil component initially can be in acid form and be subsequently reacted with the polyhydric alcohol to form the ester. Alternatively, the acid can be reacted with the polyhydric alcohol at the same time the drying oil component is being modified, for instance with a polyhydric alcohol and with or without another modifying constituent such as a polycarboxylic acid. In any event the drying oil component is essentially in the ester form when reacted with the polyoxyethylene polyol. Heat bodied or polymerized forms of the drying oil acids and esters are also useful. Thus the drying oil component may be the drying oil ester as such or the carboxylic acid or ester can be modified through pre-reaction with up to about 20 weight percent, preferably about 5 to 15 weight percent, of one or more polyfunctional compounds such as polyolefins, polycarboxylic acids and polyhydric alcohols. These acids and alcohols can also have olefinic unsaturation. The modification preferably involves a polyolefin or both a dicarboxylic acid and polyhydric alcohol. For instance, the modifying polycarboxylic acid and polyhydric alcohol will usually be employed in approximately esterification stoichiometric proportions although either may be in excess. We prefer an excess of alcohol. Generally about 25 to 75 weight percent of each of the polycarboxylic acid and polyhydric alcohol based on their mixture is used in modifying the drying oil ester with such materials. The various drying oil components can be further substituted with non-interfering substituents although they are most often employed in unsubstituted form. Regardless of its constituency the drying oil component, whether an ester itself or a modified ester, is essentially liquid at ambient temperatures and in general has a viscosity in the ranges set forth above with respect to the polyoxyethylene polyol reaction product.

The drying, including semi-drying, oils which can be used in the preparation of the water-dispersible vehicles include the synthetic polyhydric alcohol esters of non-conjugated and conjugated unsaturated fatty acids as well as non-conjugated and conjugated natural drying oils of animal and vegetable origin, all having an iodine value not less than about 110. For example, soybean oil, linseed oil, safflower oil, tung oil, perilla oil, China-wood oil, oiticica oil, walnut oil, poppyseed oil, etc., are among the natural drying and semi-drying oils which may be used while the unsaturated acids include oleic, ricinoleic, linoleic, linolenic, etc. Where tung oil or other natural conjugated oils are employed, it is preferred to first heat the oils to an elevated temperature of 280° C. or thereabouts to "gas-proof" or enable them to form non-wrinkling films, just as would be the case in their use in conventional organic solvent system paints or varnishes. Thus, the conjugated oils may be considered a special case of the modified oils which are operable. Similarly, glycerol and other higher polyhydric alcohol esters of the mixed fatty acids which characterize the natural drying and semi-drying oils may be employed. Included would also be the polyhydric alcohol esters of tall oil and of tall oil fatty acids.

When modified drying oils are used, the pre-reaction of the drying oil acid or ester component can be with a polycarboxylic acid, polyhydric alcohol or their mixture. These materials encompass aliphatic, including cycloaliphatic and aromatic dicarboxylic acids of, for instance, 2 to 12, preferably 4 to 8, carbon atoms. Representative acids are: the alpha, beta ethylenically unsaturated polycarboxylic acids, maleic, fumaric, aconitic, etc.; the saturated aliphatic polycarboxylic acids, succinic, glutaric, sebacic, azelaic, tartaric, etc.; and the aromatic polycarboxylic acids such as the phthalic acids. Also the acid anhydrides, esters, partial esters and other forms can be employed.

The polyhydric alcohols employed in the modified drying oils are aliphatic, including cycloaliphatic, in character, and are the same as those forming the ester portion of the drying oil component. The materials are alkane polyhydric alcohols generally of 3 to 6 carbon atoms and containing 3 to 6 hydroxyl groups to a molecule. Among the useful polyhydric alcohols are glycerol, mannitol, sorbitol, pentaerythritol, trimethylol propane, trimethylol ethane, 1,3,6-hexanetriol, etc. and these can be mixed with other materials, for instance ethylene glycol, diethylene glycol, dipentaerythritol, etc.

As stated the drying oil component may be modified through reaction with a polyolefinic material. The olefins can be aliphatic, including cycloaliphatic, that is alkenyl, hydrocarbons. Usually the olefinic material has about 4 to 8 carbon atoms, and among the useful materials are cyclopentadiene, cyclohexadiene, 1,4-butadiene, isoprene, etc.; however, polymers of those olefins containing 2 to 10 units of monomer may also be employed.

Among the chemically modified oils which may comprise the hydrophobic oil or oleoresinous portion of the reactants may be listed (1) the so-called synthetic polyhydric alcohol esters already described, which are prepared by heating fatty acids with higher polyhydric alcohols such as glycerol, pentaerythritol, sorbitol and the like by means well-known to the art; (2) the heat polymerized natural drying and semi-drying oils and synthetic esters described previously, said heat bodying likewise being old and well-known to the art; (3) maleic modified drying oils and semi-drying oils, made for instance as described in Schwarcman U.S. Patent 2,412,177 and the maleic modified drying oils and fatty acids made by the different processes described by Ellis U.S. Patent 2,033,131 and Clocker 2,188,882; and (4) hydrocarbon copolymers of drying and semi-drying oils, including vinyl copolymers made as described in Schwarcman U.S. Patent 2,912,396 and others and diene copolymers made as described in Gearhart U.S. Patent 2,361,018. Dehydrated castor oil is also a suitable and desirable component, and may be considered a conjugated drying oil obtained by the chemical modification or dehydration of castor oil.

Although we strongly prefer the maleic acid (including anhydride)-pentaerythritol modified oils, another class which may be employed in this invention is defined as the long oil modified phthalic anhydride, or isophthalic acid modified oils in which the oil content is about 80% or greater, and which oils are capable of being made at 100% non-volatile at viscosities of not significantly greater than about 100 poises. Specifically, such modified long oils can be made as liquid materials without the use of naphtha or other petroleum or organic solvents. This fact is of great consequence to obtaining the unique liquid products of this invention, which are capable of thinning with water to obtain dispersions and solutions having very useful properties as paint vehicles and for other purposes.

The long drying oil component can be modified by the described or other constituents under the usual conditions, e.g. temperatures of about 200 to 300° C. and pressures at or near atmospheric. Generally the reaction is continued to insure a liquid product, for instance, prolonged heating may cause undesirable gelation, and most often the acid number of the liquid product is below about 20.

Although the drying oil component-polyoxyethylene polyol liquid condensate can be dispersed in organic vehicles such as the usual paint thinners the reaction product is water-dispersible and can be used most advantageously in aqueous based coating compositions containing other ingredients if desired such as solid pigments, fungicides, mildewcides, etc., particularly zinc oxide which can be added to the reaction product, for instance in amounts up to about 100 weight percent, most often greater than about 10 weight percent based on the reaction product. The aqueous based coating composition can have varying amounts of water with the amount usually being selected by the coating applicator according to the characteristics desired in the composition both during application and after drying. In many instances, the water will be sufficient to give a product of about 1 to 3 poises viscosity for application to surfaces. The coating composition can also contain solid pigments and other ingredients. The various agents such as the pigment and fungicide are preferably added to the drying oil component-polyoxyethylene polyol reaction product prior to dilution for application as a coating.

The drying oil component-polyoxyethylene polyol liquid reaction product may be employed in other ways, for instance in making pigment concentrates. In this use the concentrate is often a relatively thick mixture and may even be in a paste or essentially solid form. These concentrates usually contain little if any water although the concentrate is water-dispersible. The various water-insoluble organic and inorganic paint pigments can be employed such as titanium dioxide, zinc oxide, phthalocyanine blue, lead chromate yellows, molybdate orange, iron oxide red, and other organic and inorganic pigments as well as extender pigments such as talc, clay, mica, etc. Other uses for the water-dispersible reaction product are contemplated, for instance it may be mixed with water and employed as an insecticide vehicle, serving to hold the active insecticide ingredient on a plant or other surface upon which the composition is applied as by spraying.

The following examples are illustrative of the principles of this invention. The reactions were conducted in carbon dioxide as an inert gas.

*Example 1*

Alkali refined linseed oil was chemically modified in accordance with the process of United States Patent 2,412,177 by alcoholizing the oil with 3.9% pentaerythritol by weight for 1 to 2 hours at about 250° C. and subsequent reaction at about 250° C. with 4.9% maleic anhydride in the presence of a PbO catalyst to yield a maleic modified oil having a viscosity of 7 poises.

331 parts of this modified oil, 69 parts of polyoxyethylene glycerol 1000 (molecular weight, 1000; hydroxyl value, 170 and freezing point −5° C.) and 0.1 part of PbO were heated together for 4 hours at 205° C.; the resinous product had a viscosity of 8 poises and a Gardner color of 8. Upon dilution to 75% NV with 15% ethylene glycol monobutyl ether and 10% water a clear vehicle of 4.5 poises viscosity was obtained. Upon further dilution with water the solution remained clear and the viscosity increased to a maximum of 10.4 poises at 55% NV. Upon further dilution with water the viscosity decreased reaching one poise at 37% NV and a translucent colloidal dispersion was obtained. NV as referred to means 100% minus the percent of water and coupling agent.

The effect of the type of glycol ether coupling solvent which may be used is exemplified by the following table:

| Glycol-ether | Coupling agent, amount percent | Vis. 75% NV, poises | Dilution with $H_2O$ at 1 poise, percent NV |
| --- | --- | --- | --- |
| Ethylene glycol monobutyl ether | 15 | 3.3 | 40 |
| Ethylene glycol monoethyl ether | 15 | 7.3 | 42 |
| Ethylene glycol monomethyl ether | 15 | 10.8 | 42 |
| Ethylene glycol monophenyl ether | 15 | 8.5 | <35 |
| Ethylene glycol monoisoamyl ether | 15 | 4.86 | 32 |

The amount of coupling solvent may be varied, altering somewhat the physical properties of the vehicle.

| Ethylene glycol monobutyl ether, percent | Percent H₂O | Viscosity maximum NV | Viscosity maximum Poises | Dilution with H₂O at 1 poise, percent NV |
|---|---|---|---|---|
| 0 | 35 | 65 | Plastic | 27 |
| 5 | 35 | 65 | Plastic | 41 |
| 10 | 25 | 65 | 70 | 41 |
| 15 | 30 | 55 | 13 | 42 |
| 20 | 30 | 50 | 5.5 | 35 |
| 25 | 25 | 50 | 3.1 | 30 |

This vehicle, i.e. the resinous product, was also diluted using water of varying hardness. Only minor differences were observed in vehicle viscosity or clarity between the vehicles reduced with deionized or hard water.

If this same vehicle were diluted with water without the use of the glycol ether, a very viscous plastic mass was obtained. Upon continued aqueous dilution the plastic mass became less viscous, achieving a milky stable material of one poise viscosity at 27% NV.

To the vehicle was added naphthenate driers at a level of 0.6% Pb, 0.06 Co and 0.02% Mn as Metals based on the resinous product. Films were cast at 1.5 mil thickness. The films dried to a glossy, clear, homogeneous finish in 16 to 24 hours.

*Example 2*

When an equal proportion of 1, 2, 6-hexane triol polyoxyethylene (1000 molecular weight, 170 hydroxyl value and freezing point of 3° C.) was substituted for the polyoxyethylene glycerol of Example 1, no significant differences were observed.

The drying speed of the vehicles of the instant invention can be accelerated by oxidation prior to application of the film. For example, the vehicle solids, i.e. the resinous product, of Example 2 were blown with air for 30 minutes at 135° C. and for 6 hours at 75° C. The viscosity increased from 7 to 36 poises. The color increased from 7 to 9 by Gardner color standards. The drying time of the film of oxidized vehicle, with the usual amount of driers, was about 5 hours while the unoxidized vehicle film dried in 16 to 24 hours.

*Example 3*

828 g. of modified linseed oil of Example 1, 172 g. of polyoxyethylene glycerol (1250 molecular weight, 135 hydroxyl value and a freezing point of 5° C.) and 0.25 g. PbO were heated together for 4.5 hours at 205° C. The product had a viscosity of 7.8 poises. When diluted to 75% NV with 15% of ethylene glycol monobutyl ether and 10% of water, a clear vehicle of 5.2 poises was obtained. Upon further dilution with water a translucent or colloidal solution vehicle of one poise was obtained at 40% NV.

When 0.6% Pb, 0.06% Co and 0.02% Mn as naphthenate were added to the vehicle and a film cast, the film set in 6 hours and was dry with slight tack in 11 hours. There was no evidence of polyether crystallization.

*Example 4*

331 parts of modified linseed oil of Example 1, 69 parts of polyoxyethylene glycerol (750 molecular weight, 225 hydroxyl value and −24° C. freezing point) and 0.1 part of PbO were heated together for 3 hours at 205° C.

A clear vehicle of 2.0 poises viscosity was obtained upon the addition of ethylene glycol monobutyl ether to 85% NV. Upon further dilution with tap water the viscosity increased, reaching a maximum of 7.4 poises at 55% NV. As more water was added the vehicle changed from solution clarity to colloidal translucence, reaching one poise viscosity at about 38% NV.

*Example 5*

878 grams of 35 poises heat polymerized soybean oil, 122 grams of polyoxyethylene glycerol 1000 and 0.04 gram of SnCl₄·5H₂O were heated together for 4 hours at 205° C. The product was cooled and reduced to 75% NV with 15% of ethylene glycol monobutyl ether and 10% water, giving a clear vehicle of 14 poises viscosity. The vehicle could be readily further diluted with water to give a colloidal type dispersion of application viscosity at about 43% NV. When catalyzed with the same level of naphthenate driers as in previous examples and cast on glass plates, a clear slow drying film was obtained.

*Example 6*

828 g. of 17 poises linseed dicyclopentadiene copolymer (containing 85% linseed oil, and made by reaction between linseed oil and cyclopentadiene under pressure at 250 to 300° C.), 172 g. of polyoxyethylene, 1,2,6-hexanetriol 1000 and 0.26 g. PbO were heated together for 2 hours at 205° C. When reduced to 40% NV with 15% ethylene glycol monobutyl ether and 45% water a product was obtained which had a viscosity of 1.25 poises. After the addition of the same level of naphthenate driers, a film was prepared which set in about 3 hours and dried with some residual tack in 24 hours. There was no evidence of polyether separation.

*Example 7*

To 880 grams of alkali refined linseed oil was added 120 g. of polyoxyethylene 1,2,6-hexanetriol 1000 over a 30 minute period, maintaining the temperature of the reaction mixture at 205° C. Upon completion of the addition 0.18 g. of PbO was added. The reaction was continued for one hour at 205° C. When the product was diluted to 40% NV with water, a product of 0.2 poise was obtained. After addition of the usual amount of driers, the film of this vehicle was found to set in 3 to 4 hours and dry with some residual tack in 24 hours. The film was clear and free of polyether imperfections.

*Example 8*

Alkali refined linseed oil was modified with 3.5% of glycerol, 5.05% maleic anhydride using a calcium naphthenate catalyst in the same manner as employed in Example 1, giving a product of 4.6 poises viscosity and an acid value (AV) of 9.9.

To 1656 grams of this modified oil, heated to 205° C. was added 344 grams of polyoxyethylene glycerol 1000 over a 30 minute period. 0.52 g. of PbO was then added and the reaction mixture was maintained at 205° C. for another 2½ hours. When this product was reduced to 40% NV with 15% of ethylene glycol monobuty ether and 45% of water, an essentially clear vehicle of 1.2 poises was obtained.

*Example 9*

Linseed oil is modified with 6% pentaerythritol and 12% isophthalic anhydride by alcoholysis of the oil followed by esterification with the isophthalic acid to give a modified oil having a viscosity of about 45 poises and an acid value of less than about 10.

To 1656 grams of this modified oil is added 344 grams of polyoxyethylene glycerol 1000 over a 25 minute period followed by an addition of 0.52 g. of PbO. During the addition period and for an added 2½ hours the temperature of the reaction mixture is maintained at 205° C. When this product is reduced to 40% NV with 15% ethylene glycol monobutyl ether and 45% water, a clear solution of about 2.2 poises viscosity is obtained. Upon the addition of the usual amount of naphthenate driers, the applied film is found to set in 7 hours and dry in about 24 hours. The film exhibits no evidence of polyether separation.

*Example 10*

This example illustrates that the polyoxyethylene component can be combined with the oleoresinous component by methods other than alcoholysis. In this example some of the hydroxyls of the polyoxyglycerol are combined to the oleoresinous phase by reaction with an anhydride.

2000 g. of 12 poise heat polymerized linseed oil, 1400 g. of alkali refined linseed oil and 73 g. of maleic anhydride were heated together for one hour at 260° C. To 1656 grams of this product, was added 344 grams of polyoxyethylene glycerol 1000 over a period of 30 minutes. The reaction mixture was maintained at 205° C. during the addition period and for an additional 2½ hours.

To this reaction product was added 10% ethylene glycol monoethyl ether and 10% ethylene glycol monobutyl ether, giving a clear vehicle of 2.4 poises viscosity. Upon the addition of water the vehicle remained clear but increased in viscosity, reaching a maximum at about 60% NV. Upon further addition of water the vehicle became less viscous, reaching 1 poise at about 42% NV and exhibited some colloidal translucence.

The film from this vehicle after the addition of the same level of naphthenate driers as in the other examples was found to set in 2 hours and dry with some residual tack in 5 hours.

*Example 11*

3000 grams of tall oil fatty acids were esterified with 428 grams of pentaerythritol at 250° C. to an AV (acid value) of less than 15. The ester was then heated to 305° C. and held at this temperature for 4.5 hours. The resultant product had a viscosity of 6 poises, and an AV of 6.5.

1650 parts of this product was heated with 350 parts of polyoxyethylene glycerol (molecular weight 1000) and 0.5 g. PbO to 205° C. and held at this temperature for 8 hours to give a product of 5.8 poises viscosity. 85 parts of this product and 15 parts ethylene glycol monobutyl ether gave a clear vehicle of 1.8 poises viscosity. It could be further diluted with water to less than 30% NV obtaining clarity or translucene as the aqueous reduction was made. The vehicle could also be diluted with unbodied or bodied linseed oil.

To 85 parts of the esterified tall oil fatty acids-polyoxyethylene glycerol product and 15 parts of ethylene glycol monobutyl ether were added driers at the same level as in the previous examples and a sufficient amount of water to make a solution having 45% NV. When cast at 1.5 mil dry film thickness on a glass plate the film dried in essentially the same manner as was noted in Example 1.

*Example 12*

1656 grams of dehydrated castor oil having a viscosity 7.5 poises and an acid value of 4.8 was heated to 205° C. in a closed vessel. 344 grams of polyoxyethylene glycerol (1000 molecular weight) was added over a 30 minute period followed by the addition of 0.5 g. PbO. The reaction mixture was held at 205° C. for an additional 3.5 hours. The resultant clear vehicle had a viscosity 7.4 poises. When 85 parts of this vehicle and 15 parts of ethylene glycol monobutyl ether were reduced to 40% NV with water, a translucent vehicle of 5.8 poises viscosity was obtained. When further reduced with water to 35 and 30% NV, stable colloidal solutions of 3.2 and 0.7 poises viscosity respectively was obtained. When water dispersed driers at the levels of Example 1 were added to the vehicle and a film was cast on a glass plate, the film set in 3 hours and was dry in 4 to 5 hours.

*Example 13*

828 grams of tung oil was heated under inert gas to 205° C. in a closed reaction vessel. 172 grams of polyoxyethylene glycerol (1000 molecular weight) was added to the oil over a 30 minute period, followed by the addition of 0.26 g. PbO. The reaction temperature was maintained at 205° C. during the polyether addition and for 2 hours and 45 minutes longer. The resultant product had a viscosity 36 poises at 25° C. When 37.5 parts of this product was diluted with 7.5 parts of ethylene glycol monobutyl ether and 48.8 parts of tap water (40% nonvolatile), a stable vehicle exhibiting translucence and a one poise viscosity was obtained. To this aqueous vehicle was added 0.6% PbO, 0.06% Co and 0.02% Mn as naphthenates. The percent expressed is metallic content on basis of vehicle solids. A 3 mil wet or 1.2 mil dry film was cast on a glass plate. The resultant film dried in 2 hours.

*Example 14*

750 grams of modified linseed of Example 1, 250 grams of polyoxyethylene pentaerythritol (1000 molecular weight, 225 hydroxyl value and a −8° C. freezing point) and 0.38 g. PbO were heated together for 4 hours at 205° C. Upon the dilution of the cooled product to 35% NV with 15% of ethylene glycol monobutyl ether and 50% of tap water an essentially clear vehicle of 0.9 poise was obtained.

*Example 15*

1650 grams of modified linseed of Example 1 was heated to 205° C. with 350 grams of polyoxyethylene pentaerythritol (molecular weight about 1000 and hydroxyl value of about 225) and 0.52 PbO. The reaction mixture was held at this temperature for 2.5 hours. After cooling, 85 parts of the reaction product was reduced to 40% non-volatile with 15 parts of ethylene glycol monobutyl ether and 112 parts of water. The resultant vehicle was translucent and had a viscosity of 1.3 poises. The vehicle after cooling and addition of the coupling solvent, could also be diluted with either refined or polymerized linseed oil, illustrating how the resultant vehicle may be diluted by oleoresinous materials as well as aqueous systems.

*Example 16*

A white exterior house paint was prepared using the resinous product of Example 1 containing 15% etheylene glycol monobutyl ether, as follows:

| Materials: | Gms. |
|---|---|
| Rutile TiO$_2$ | 75 |
| Anatase TiO$_2$ | 150 |
| Zinc Oxide | 200 |
| Talc | 150 |
| Mildewcide (phenylmercuric acetate) | 2 |
| Product of Example 1 (85% NV) | 355 |
| 6% Cobalt Naphthenate | 3 |
| 6% Manganese Naphthenate | 1 |
| 24% Lead Naphthenate | 7.5 |
| Water | 335 |
| | 1,278.5 |

A portion (200 gms.) of the resinous product of Example 1 was taken and the pigments made into a heavy mill paste using a premixer; the mildewcide was added at this point. About 190 gms. of the water was then added and the grinding paste was passed through a laboratory high-speed mill. The driers were added to the balance of the vehicle from Example 1, and the mill paste was combined with this retained vehicle. The paint was adjusted to final viscosity by adding the remaining 145 gms. of water.

The paint had the following constants.

| Constants: | |
|---|---|
| PVC | 32.3%. |
| Wt./gal. | 12.5 lbs./gals. |
| Total NV | 68.4%. |
| Vehicle NV | 43.5%. |
| Viscosity | 85 KU (Krebs unit). |
| Grind | 4–5 NS (North Standard). |

The same paint was also prepared on a roller mill, a pebble mill, and a laboratory dissolver with similar results.

In a series of laboratory tests the paint was shown to have a drying time and gloss better than a conventional solvent-thinned high quality linseed oil paint, good application properties, excellent cleanup of brushes used therein, good adhesion to chalky surfaces, good one coat coverage, and excellent weatherometer resistance (1000 hours without failure).

*Example 17*

The resinous products of Examples 1 and 5 were also used as a grinding medium for various inorganic and organic colors; the tint pastes so prepared were found to be compatible with both solvent-thinned paints and enamels based on linseed oil and alkyd resins as well as with synthetic latices based on styrene butadiene, polyvinylacetate and acrylic monomers.

The vehicles of the present invention also can be used to prepare films which will respond to accelerated curing at temperatures commonly used to bake conventional coatings. The following is illustrative.

*Example 18*

The reaction product of Example 1 was reduced to 85% NV with ethylene glycol monobutyl ether. To one portion of this vehicle was added 0.2% Pb (Nuodex Product's Cyclodex drier); to another was added 0.02% Co and to a third portion 0.02% Mn. These three vehicles were then reduced to 50% NV with water and 3 mils (wet) films were cast on glass plates. The plates were then placed in a 300° F. oven and baked for 60 minutes. The following results were obtained.

|  | 0.2% Pb | 0.02% Co | 0.02% Mn |
|---|---|---|---|
| Film tack | Slight | Very slight | Very slight. |
| Film color | Slight yellowing | Yellowing | Very slight yellowing. |

The hardness of the baked films can be increased by variation of the baking schedule, vehicle formulation, or by addition of hardening resins.

It is claimed:

1. A liquid, water-dispersible composition of matter having a viscosity of up to about 100 poises which is a condensate of a mixture consisting essentially of about 75 to 90 percent of a drying oil ester of an unsaturated fatty acid of 14 to 20 carbon atoms and a polyhydric alkanol of 3 to 6 carbon atoms and having 3 to 6 hydroxyl groups, and about 10 to 25 percent of a polyoxyethylene polyol having a molecular weight of about 500 to 2000, said polyol having the formula $$R-[O(C_2H_4O)_nH]_m$$

where R is an *m*-valent hydrocarbon radical of 3 to 6 carbon atoms, *n* is 4 to 12, and *m* is 3 to 6.

2. The composition of claim 1 in which *m* is 3.
3. The composition of claim 1 in which the drying oil ester is linseed oil.
4. The composition of claim 1 which contains about 10 to 100 percent zinc oxide based on said condensate.
5. The composition of claim 1 in which the ester is a drying oil ester modified with a polyhydric alkanol of 3 to 6 carbon atoms and having 3 to 6 hydroxyl groups and a dicarboxylic acid of 4 to 8 carbon atoms, said polyhydric alkanol and dicarboxylic acid being present in an amount of about 5 to 20 percent of the drying oil ester.
6. The composition of claim 5 in which the dicarboxylic acid is maleic acid and the modifying polyhydric alcohol is pentaerythritol.
7. The composition of claim 1 which contains about 5 to 25 percent of a coupling agent boiling in the range of about 100 to 200° C. and having the formula $$RO(CH_2CH_2O)_xH$$

wherein R is a lower alkyl radical of up to about 5 carbon atoms and *x* is 1 to 2.

8. The composition of claim 1 in which the ester is a drying oil ester modified with about 5 to 20 percent of dicyclopentadiene.
9. A liquid, water-dispersible composition of matter having a viscosity of up to about 100 poises which is a condensate of a mixture consisting essentially of about 75 to 90 percent of a drying oil ester of an unsaturated fatty acid of 18 carbon atoms and a polyhydric alkanol of 3 to 6 carbon atoms and having 3 to 4 hydroxyl groups, and about 10 to 25 percent of polyoxyethylene glycerol having a molecular weight of about 600 to 1200, said drying oil ester being modified with about 5 to 15 percent of maleic acid and pentaerythritol in approximately stoichiometric proportions.
10. The composition of claim 9 in which the drying oil ester is linseed oil.
11. The composition of claim 9 which contains about 10 to 100 percent zinc oxide based on said condensate.
12. The composition of claim 9 which contains about 5 to 25 percent of a coupling agent boiling in the range of about 100 to 200° C. and having the formula $$RO(CH_2CH_2O)_xH$$

wherein R is a lower alkyl radical of up to about 5 carbon atoms and *x* is 1 to 2.

13. The composition of claim 12 in which the coupling agent is ethylene glycol monobutyl ether.
14. The composition of claim 1 in which the drying oil ester is a semi-drying oil ester.
15. The composition of claim 1 in which the drying oil ester is heat polymerized soybean oil.
16. The composition of claim 9 in which the drying oil ester is heat polymerized soybean oil.
17. A liquid, water-dispersible composition of matter having a viscosity of up to about 100 poises which is a condensate of a mixture consisting essentially of about 75 to 90 percent of a drying oil ester of an unsaturated fatty acid of 18 carbon atoms and a polyhydric alkanol of 3 to 6 carbon atoms and having 3 to 4 hydroxyl groups, and about 10 to 25 percent of polyoxyethylene glycerol having a molecular weight of about 600 to 1200, said drying oil ester being modified with about 5 to 15 percent of maleic acid and glycerol in approximately stoichiometric proportions.
18. A liquid, water-dispersible composition of mattter having a viscosity of up to about 100 poises which is a condensate of a mixture consisting essentially of about 75 to 90 percent of a drying oil ester of an unsaturated fatty acid of 18 carbon atoms and a polyhydric alkanol of 3 to 6 carbon atoms and having 3 to 4 hydroxyl groups, and about 10 to 25 percent of polyoxyethylene glycerol having a molecular weight of about 600 to 1200, said drying oil ester being modified with about 5 to 15 percent of isophthalic anhydride and pentaerythritol in approximately stoichiometric proportions.
19. A liquid, water-dispersible composition of matter having a viscosity of up to about 100 poises which is a condensate of a mixture consisting essentially of about 75 to 90 percent of a drying oil ester of an unsaturated fatty acid of 14 to 20 carbon atoms and a polyhydric alkanol of 3 to 6 carbon atoms and having 3 to 6 hydroxyl groups, and about 10 to 20 percent of a polyoxyethylene polyol having a molecular weight of about 600 to 2000, said polyol having the formula $R-[O(C_2H_4O)_nH]_m$ where R is an *m*-valent hydrocarbon radical of 3 to 6 carbon atoms, *n* is 4 to 12, and *m* is 3 to 6.
20. A liquid, water-dispersible composition of matter having a viscosity of up to about 100 poises which is a condensate of a mixture consisting essentially of about 75 to 90 percent of a drying oil modified with about 5 to 20 percent of a member selected from the group consisting of polyhydric alkanols of 3 to 6 carbon atoms and 3 to 6 hydroxyl groups, polycarboxylic acids of 2 to 12 carbon atoms and diolefins of 4 to 8 carbon atoms, and about 10 to 25 percent of a polyoxyethylene polyol having a molecular weight of about 500 to 2000, said polyol having the formula $R-[O(C_2H_4O)_nH]_m$ where R is an $m$-valent hydrocarbon radical of 3 to 6 carbon atoms, $n$ is 4 to 12, and $m$ is 3 to 6.

21. The composition of claim 20 in which the amount of polyoxyethylene polyol is about 12 to 20 percent and the polyoxyethylene polyol has a molecular weight of about 600 to 1200.

22. The composition of claim 20 in which the drying oil is modified in an amount of about 5 to 15% with a polyhydric alkanol of 3 to 6 carbon atoms and 3 to 6 hydroxyl groups, and a dicarboxylic acid of 2 to 12 carbon atoms, each in an amount of about 25 to 75% based on their combination.

References Cited in the file of this patent

UNITED STATES PATENTS

| | | |
|---|---|---|
| 2,412,176 | Schwarcman | Dec. 3, 1946 |
| 2,530,370 | Auer | Nov. 21, 1950 |
| 2,558,025 | Wicks | June 26, 1951 |
| 2,723,920 | Schwammberger | Nov. 15, 1955 |
| 2,878,135 | Willis | Mar. 17, 1959 |
| 2,908,585 | Koenecke | Oct. 13, 1959 |
| 2,938,044 | Dazzi | May 24, 1960 |
| 2,952,556 | Gast et al. | Sept. 13, 1960 |
| 2,963,380 | Leipen | Dec. 6, 1960 |
| 2,978,346 | Pennoyer | Apr. 4, 1961 |